May 27, 1930.   S. E. BOYNTON   1,759,835
MATERIAL FEEDING APPARATUS
Filed Nov. 30, 1927   3 Sheets-Sheet 1
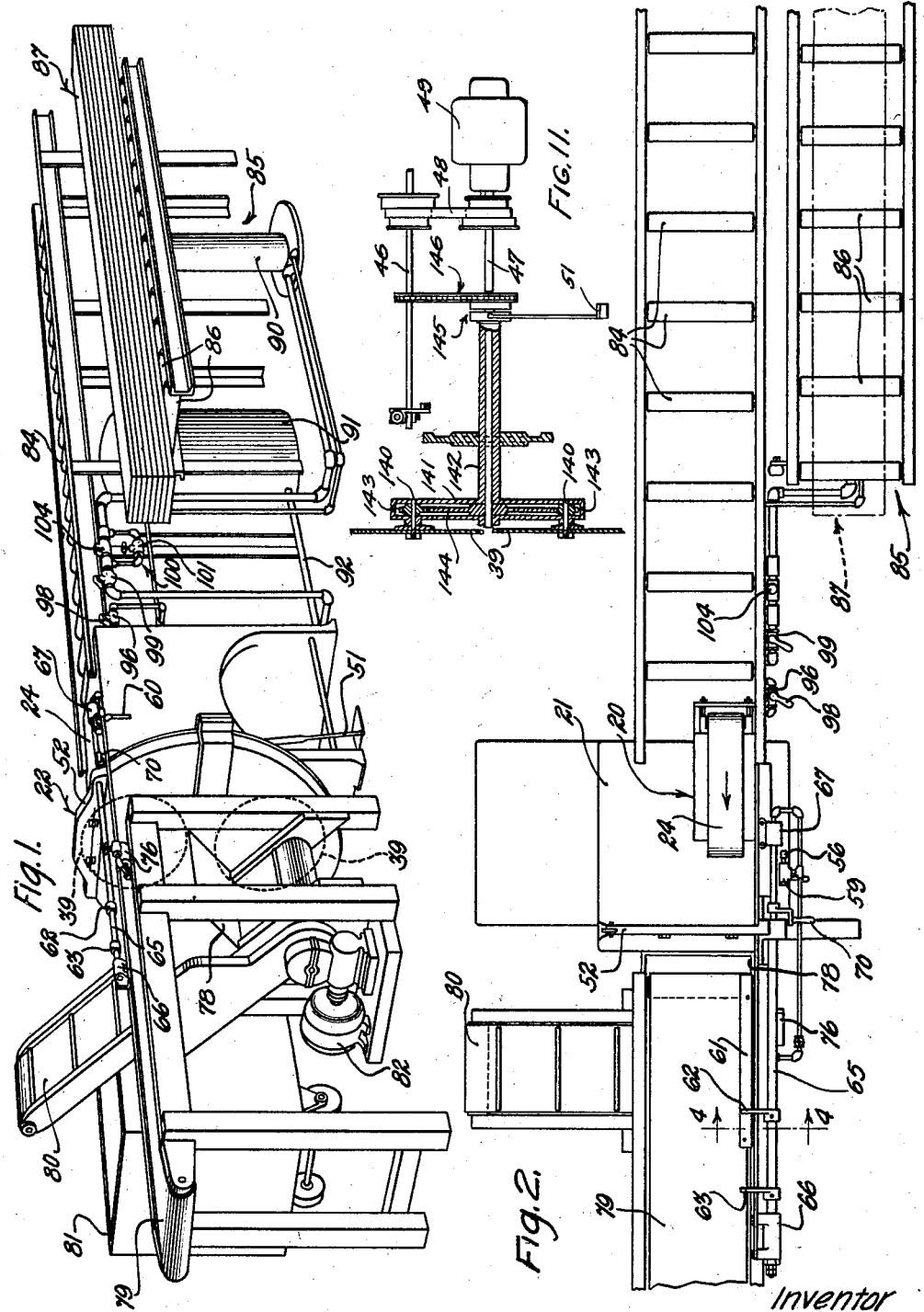
Inventor
Stanley E. Boynton
by *N. Patterson* Atty.

May 27, 1930.  S. E. BOYNTON  1,759,835
MATERIAL FEEDING APPARATUS
Filed Nov. 30, 1927   3 Sheets-Sheet 2
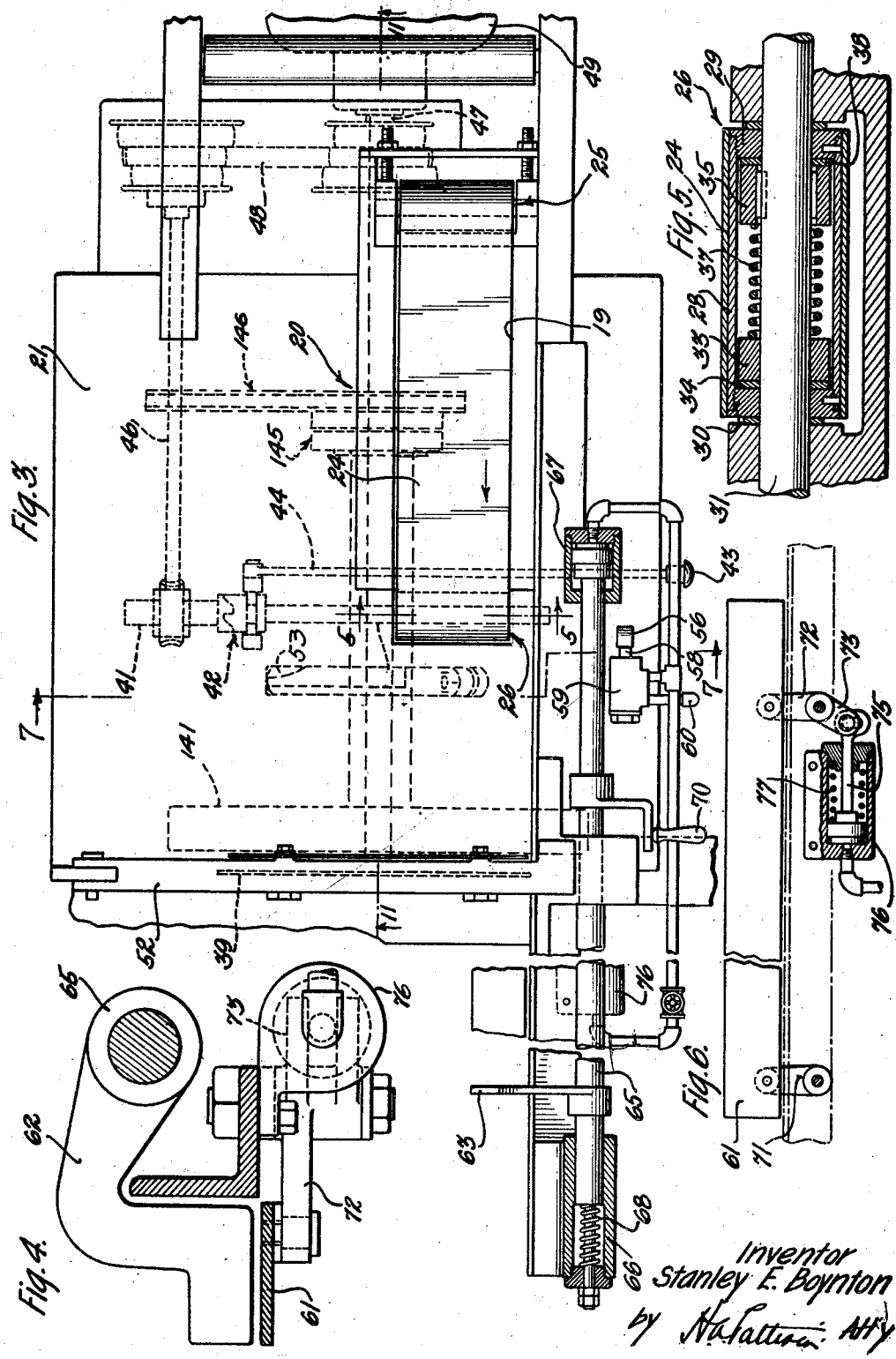
Inventor
Stanley E. Boynton

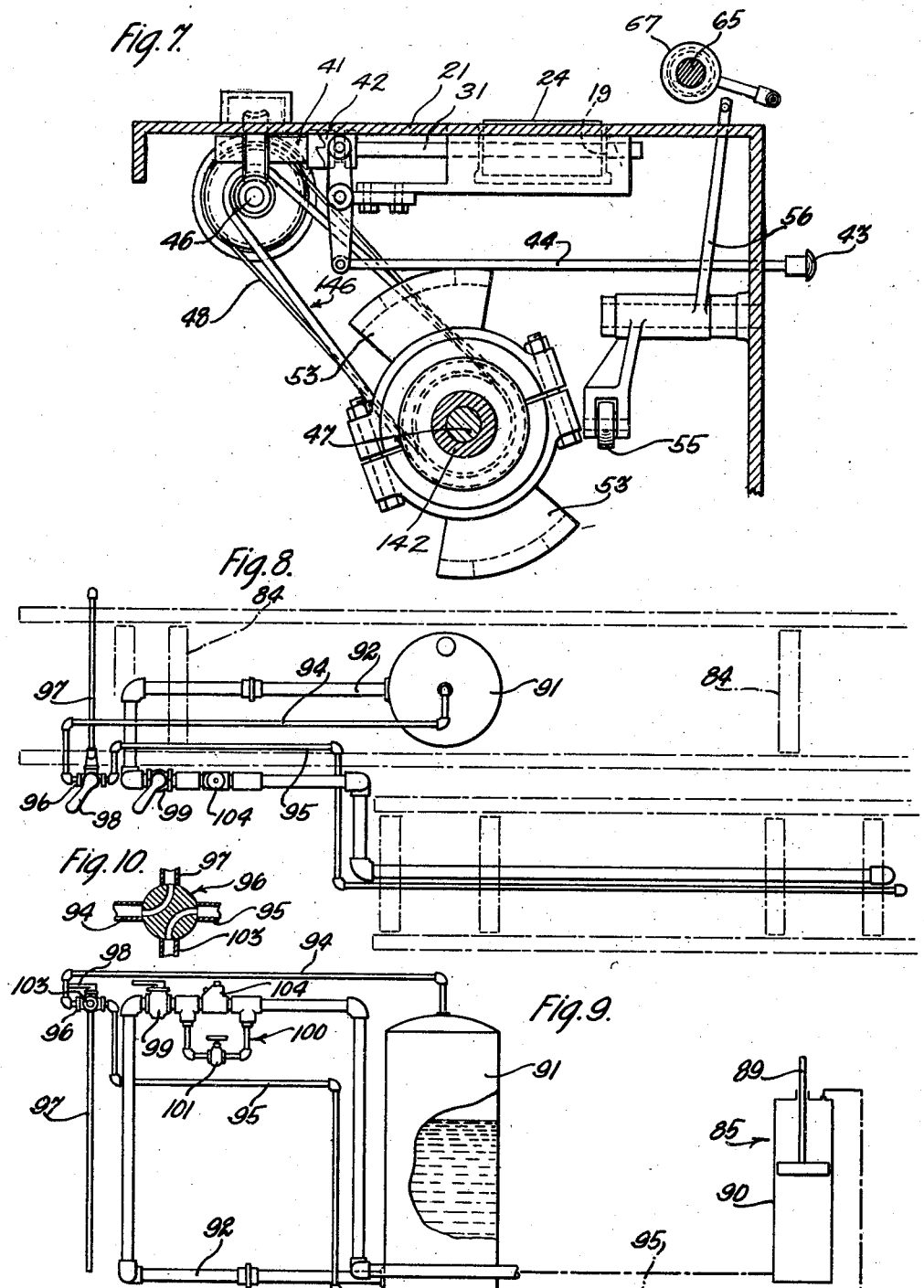

Patented May 27, 1930

1,759,835

UNITED STATES PATENT OFFICE

STANLEY EDWARD BOYNTON, OF OAK PARK, ILLINOIS, ASSIGNOR TO WESTERN ELECTRIC COMPANY, INCORPORATED, OF NEW YORK, N. Y., A CORPORATION OF NEW YORK

MATERIAL-FEEDING APPARATUS

Application filed November 30, 1927. Serial No. 236,629.

This invention relates to material feeding apparatus, and more particularly to apparatus for feeding lumber and the like to sawing machines.

The primary object of this invention is to provide a simple, durable, and efficiently operable means for feeding parts to a material working means.

In accordance with the general features of the invention, one embodiment thereof comprises a lumber feeding apparatus including an endless conveyor means associated with a sawing machine to feed or advance lumber upon a movable shelf and into proper position against adjustable stops. Upon the completion of a cutting action of the saw an air operated valve effects the disengagement of the stops and the retraction of the shelf to insure the deposition of a severed part upon a continuously moving belt. Means is provided for disposing of scrap pieces and a hydraulic elevating device is employed to facilitate the feeding of lumber to conveyor rollers at proper predetermined intervals. To arrest the advancement of the material by the conveyor before it reaches the stops, it is only necessary to exert abnormal pressure upon the material and thereby render the conveyor functionally inoperative.

The objects of this invention will be more apparent from the following detailed description when considered in connection with the accompanying drawings, wherein Fig. 1 is a perspective view of a lumber feeding apparatus representing one embodiment of the invention shown in association with a conventional type of sawing machine;

Fig. 2 is a fragmentary plan view of the apparatus disclosed in Fig. 1;

Fig. 3 is an enlarged fragmentary plan view of the portion of the feeding apparatus directly associated with the sawing machine;

Fig. 4 is a transverse vertical sectional view taken on the line 4—4 of Fig. 2, disclosing the relative positions of the stop and the associated movable shelf;

Fig. 5 is an enlarged central vertical sectional view taken longitudinally of the endless conveyor driving means on the line 5—5 of Fig. 3;

Fig. 6 is an enlarged plan view of the movable shelf shown in Fig. 2, a portion of the air operated shifting mechanism being shown in section to disclose parts otherwise hidden and a portion of the frame member which supports the movable shelf being shown in dotted line to clarify the showing of the operating mechanism;

Fig. 7 is a fragmentary transverse sectional view of the feeding apparatus taken on the line 7—7 of Fig. 3;

Fig. 8 is a plan view of the mechanism for controlling the number elevating means, the roller conveying means being shown in dot and dash lines;

Fig. 9 is a front elevational view of the apparatus disclosed in Fig. 8, the positive mechanism for operating the lumber elevating mechanism being shown diagrammatically;

Fig. 10 is a horizontal diagrammatical sectional view taken centrally of the air control valve disclosed in Figs. 8 and 9, and Fig. 11 is a fragmentary sectional view taken on the line 11—11 of Fig. 3 in the directions of the arrows.

Referring now to the drawings wherein like numerals have been employed to designate similar parts throughout the various figures, it will be observed that an endless conveyor means denoted generally by the numeral 20 (Figs. 2 and 3) is shown in association with the upper surface of a table 21 of a conventional lumber sawing machine denoted generally by the numeral 22. In this connection it is to be understood that the sawing machine 22 is representative of one of many types of woodworking machines to which the improved feeding apparatus including the endless conveyor means 20 may be readily applied and therefore the particular type of sawing machine disclosed should in no way limit the scope of the invention which resides primarily in the feeding apparatus associated therewith.

The endless conveyor means 20 includes a conveyor belt 24 which extends between an idler pulley 25 and a driving pulley or mechanism 26 (Fig. 5). These pulleys 25 and 26 are so positioned that the upper reach of the belt 24 is positioned slightly above the upper surface of the machine table 21 and the lower reach of the belt 24 and the pulleys 25 and 26 are positioned in a recess 19 in the machine table 21. Thus it will be clear that if the belt 24 is driven in the direction indicated by the arrows (Figs. 2 and 3), a piece of lumber resting thereon will be advanced in the same direction. The driving pulley or mechanism 26 (Fig. 5) includes a cylindrical member 28 which is closed at each end by means of heads 29 and 30 threaded therein. The periphery of the cylindrical member 28 frictionally engages the belt 24 and the heads 29 and 30 are rotatable and slidable upon a drive shaft 31. Within the cylindrical member 28 and slidable upon the shaft 31 is a collar 33, and interposed between this collar 33 and the threaded head 30 is a friction disk 34. Interposed between the collar 33 and a collar 35 which is keyed to the shaft 31 is a coil spring 37 and positioned between the collar 35 and the threaded head 29 is a friction disk 38. From the foregoing description of the driving pulley 26 it will be apparent that the force of the coil spring 37 causes the frictional engagement of the disks 34 and 38 with their respective associated parts during the rotation of the shaft 31, and thus the conveyor belt 24 is moved in the direction indicated. The action of the coil spring 37 will serve to produce sufficient frictional engagement to cause the advancement of a piece of lumber resting upon the conveyor belt 24, but if additional pressure is applied to the belt 24 the force exerted by the coil spring will not be sufficient to move the belt and hence the conveyor mechanism will be rendered functionally inoperative. Thus, if a piece of work is being advanced toward circular saws 39 of the sawing machine 22 and it is desired to arrest the advancemnet of the piece of lumber, it is only necessary for the operator to apply additional or abnormal pressure to render the advancing force of the conveyor means ineffective. The shaft 31 which supports the driving pulley 26 may be operatively connected with a drive shaft 41 (Figs. 3 and 7) by means of a clutch mechanism 42 which may be conveniently operated by manipulating a knob 43 at the forward extremity of a shifter bar 44. The shaft 41 is geared to another shaft 46 which is continuously driven from a main drive shaft 47 by means of a belt 48.

This main drive shaft 47 which is rotated by means of a motor 49 or other suitable actuating means, forms the main drive shaft of the conventional sawing machine 22. Only those features of the sawing machine are shown which are believed to be essential to a clear understanding of the invention which resides in the feeding apparatus associated therewith. The circular saws 39 are mounted on and rotatable with shafts 140—140 journalled in brackets 141—141 which extend from a sleeve 142 mounted on and freely rotatable about the main drive shaft 47. Pinion gears 143—143 are keyed to the shafts 140—140 and mesh with a large spur gear 144 secured to the main drive shaft 47. Thus the saws are constantly driven by the motor 49 and may be rotated about the shaft 47 by moving the sleeve 142 thereabout. This movement of the sleeve may be accomplished by pressing upon a foot lever 51 (Figs. 1 and 11) which controls the operation of a clutch 145. The clutch driving member is driven from the shaft 46 by a chain and sprocket gear mechanism, designated generally by the numeral 146. The clutch is of a well known type and upon its actuation by the lever 51 is effective to cause the sleeve 142 to be rotated one-half of a revolution and then disengage. Any type of clutch capable of performing this operation may be used in this capacity and since it does not form a part of this invention, no particular embodiment thereof has been disclosed. Oppositely disposed cams 53 (Fig. 7) are clamped in position upon the drive shaft 47 and the surfaces of these cams are designed for engagement with a roller 55 to effect the swinging of a lever arm 56, the upper end of which engages a plunger 58 (Fig. 3) of an air valve 59. It will be observed that the engagement of the cams 53 with the roller 55 takes place immediately after each of the saws 39 has swept across the end of the table 21, or in other words immediately after a piece of lumber has been severed. The air valve 59 which is connected with a source of pressure supply (not shown) by means of a pipe 60 (Figs. 3 and 7) serves to control the operation of a movable shelf 61 and stop members 62 and 63 (Fig. 2).

These stops 62 and 63 are secured to a horizontal shaft 65 (Figs. 1, 3, and 4) which is longitudinally slidable within a housing 66 at one extremity and a housing 67 at the opposite extremity. A coil spring 68 within the housing 66 continuously urges the shaft 65 to the right (Fig. 3) and the chamber presented within the housing 67 is connected by means of suitable piping with the air valve 59. Thus, it will be clear that upon the operation of the valve 59, air will be admitted into the chamber of the housing 67 and will cause the shaft 65 to be moved to the left (Fig. 3) against the action of the spring 68. This shifting of the shaft 65 is sufficient to move the stops 62 and 63 away from engagement with the advanced end of a piece of lumber which has contemporaneously been severed by the action of the saws 39. Either of the stops 62 and 63 may be employed to engage the extremity of a piece of lumber advanced by the conveyor belt 24 and the position of the stops upon the shaft 65 will be dependent upon the desired length of the pieces which are to be severed. A handle 70 (Figs. 2 and 3) is employed to rotate the shaft 65 in order to bring either of the stops 62 and 63 into their proper position.

The shelf 61 is horizontally supported at the extremity of a pair of pivoted arms 71 and 72 (Figs. 4 and 6) and the arm 72 is provided with an oppositely disposed portion 73 which is connected with a piston rod 75. This piston rod 75 operates within a housing 76 which has a suitable pipe connection with the air valve 59. From the foregoing it will be clear that when the air valve 59 is operated, the piston rod 75 will be urged to the right (Fig. 6) against the action of a coil spring 77 and the shelf 61 will be moved to the left (Fig. 6) and partially under the part of the framework shown in dot and dash lines. The retraction of the shelf 61 takes place simultaneously with the shifting of the stops 62 and 63, just described, and permits a severed piece of lumber to fall freely upon a continuously traveling belt 79.

This belt 79 carries the severed parts to the left (Figs. 1 and 2) and a second conveyor belt 80 is employed to receive scrap pieces of lumber which are directed thereto by means of a chute 78 (Figs. 1 and 2) positioned adjacent the saws 39 which is designed to receive the severed scrap parts. This belt 80 conveys the scrap parts to a suitable receiving truck 81 and it is to be understood that both of the belts 79 and 80 are continuously driven by means of an electric motor 82. The speed of the motor 82 may be controlled in any suitable manner to conform with the speed with which it is desired to advance the severed pieces of lumber.

A plurality of roller conveyors 84 serve to receive a piece of lumber prior to its association with the conveyor belt 24 and in order to facilitate the feeding of each piece of lumber to the rollers 84, a lumber elevating means denoted generally by the numeral 85 is employed. This elevating means 85 includes a plurality of rollers 86 for supporting a stack of lumber 87 as clearly shown in Fig. 1. These rollers 86 are suitably supported at the upper extremity of a vertical shaft or piston rod 89 indicated diagrammatically in Fig. 9, which extends downwardly within a conventional hydraulic cylinder 90. The lower extremity of the hydraulic cylinder 90 is connected with the lower extremity of a tank 91 by means of suitable piping 92. This tank 91 retains a supply of oil or other suitable material and the upper extremity thereof is connected by means of piping 94 with a source of compressed air (not shown) through a valve 96 and likewise the upper extremity of the hydraulic cylinder 90 is connected with this supply of compressed air by means of piping 95 which also connects with the valve 96. This valve 96 (Figs. 8, 9, and 10) which is connected with the compressed air source by means of a pipe 97, operates to control the admission of air into the tank 91 and when a handle 98 of the valve 96 assumes the position to the left as shown in the drawing, the connection between the source of supply of compressed air and the upper end of the tank 91 will be effected. This permits the introduction of compressed air into the tank 91 again and causes the oil contained therein to be forced through a valve 99 and thence around a by-pass 100 provided with a needle valve 101, and from this point the oil is conveyed into the lower end of the hydraulic cylinder 90 to effect the raising of the piston rod 89. When the rod 89 has been raised to the desired height and is ready to be lowered, the handle of the air valve 96 may be moved in a counter-clockwise direction so as to connect the pipe 94 with an exhaust pipe 103 and simultaneously connect the pipe 95 with the source of compressed air. The rod 89 will then be lowered within the cylinder 90 and the oil within the pipe 92 will flow through a check valve 104 and through the valve 99 into the tank 91. Thus it will be observed that the speed with which the stack of lumber 87 is to be raised may be conveniently controlled by merely manipulating the needle valve 101. The speed with which the lumber is elevated will be dependent upon the speed with which the operator completes the severing of each piece of lumber, and thus the speed of elevation may be so controlled that upon the completion of the severing of each piece of lumber, the stack 87 will have been raised sufficiently to bring the uppermost piece of lumber into a position parallel with the upper surfaces of the rollers 84 and it will only be necessary for the operator to slide this uppermost piece of lumber upon the rollers.

By means of the apparatus described, the feeding of lumber or other articles of a like nature is greatly facilitated and the amount of manual labor is reduced to a minimum. In the operation of the apparatus a stack of lumber may be placed upon the rollers 86 when they occupy their lowermost position, and by adjusting the needle valve 101 the speed with which the stack raises may be effectively controlled. By opening the valve 99 and turning the handle 98 to the left as shown in Fig. 8, the stack of lumber will be caused to slowly rise and simultaneously the uppermost piece of lumber may be manually associated with the rollers 84. This piece is then carried into association with the conveyor belt 24 which causes it to be advanced into engagement with one of the stops 62 and 63 and to rest upon the upper surface of the shelf 61. Should the operator desire to stop the advancement of the piece of lumber before it reaches the stops 62 or 63, it will only be necessary to apply additional or abnormal pressure upon the piece and consequently upon the belt 24. The convenient arrangement for arresting the movement of the conveyor belt enables an operator to stop the advancement of material instantly in the event that the operator's hands are moved into dangerous proximity with the cutting saws. Likewise, when the operator wishes to saw off a small end portion of the advancing piece of lumber, such for example as an end portion containing an undesirable knot, the advancement of the lumber may be arrested at the desired interval to permit this small end portion to be removed. Immediately subsequent to the engagement of the piece of lumber with the stops the foot pedal or lever 51 is actuated and this causes the saws to rotate about the shaft 47 and contemporaneously with the completion of the severing action of the saw, the stops 62 and 63 are disengaged from the extremity of the piece of lumber and the shelf 61 is retracted so as to positively insure the deposition of the severed part upon the continuously moving belt 79. Severed scrap pieces are carried by gravity into the chute 78 which directs said pieces to the belt 80 and the properly severed pieces are advanced by the belt 79. After the entire piece of lumber has been severed into several parts, the stack will have been raised sufficiently to present a second piece of lumber in a convenient position for association with the rollers 84 and the operation just described is again repeated. From the foregoing it will be clear that this feeding apparatus presents a very convenient and expeditiously operable means for continuously feeding lumber to a sawing machine or other type of woodworking machine.

Although the invention has herein been described in connection with apparatus for feeding lumber to a sawing machine, it is to be understood that the invention is capable of many other applications and should be limited only by the scope of the appended claims.

What is claimed is:

1. In wood-working apparatus, a sawing table, a pair of rotary saws alternately movable into operative association with material to be sawed, an endless conveyor positioned in the table for advancing material to the saws, means for arresting the advancement of the material, and means responsive to the operation of either of the saws and operable subsequent to said operation to move the arresting means away from the material.

2. In a wood-working apparatus, a stationary work support having a recess therein, a pair of rotary saws alternately movable into operative association with the work support, an endless conveyor positioned in said recess for advancing the work to the saws, a stop member for arresting the advance of the work, and means responsive to the operation of either of the saws to move the stop member relative to the saws.

3. In a wood-working apparatus, a work support, a pair of rotary saws alternately movable into operative association with the work support, a frictionally driven conveyor positioned adjacent the work support for advancing the work to the saws, a stop member normally positioned to arrest the advance of the work, fluid actuated means for moving the stop member away from the saws, and means responsive to the operation of either of the saws for admitting fluid to the fluid actuated means.

4. In a wood-working apparatus, a work support, a pair of rotary saws alternately movable into operative relation to the work support, means for advancing the work to the saws, a stop member normally positioned to arrest the advance of the work, means for yieldingly maintaining the stop member in normal position, fluid actuated means for moving the stop member relative to the saws, and means responsive to the operation of either of the saws for controlling the operation of the fluid actuated means.

In witness whereof, I hereunto subscribe my name this 16th day of November, A. D. 1927.

STANLEY EDWARD BOYNTON.